(12) United States Patent
Lee et al.

(10) Patent No.: US 10,821,553 B2
(45) Date of Patent: Nov. 3, 2020

(54) METHOD FOR CUTTING POLARIZING PLATE AND POLARIZING PLATE CUT USING SAME

(71) Applicant: LG CHEM, LTD., Seoul (KR)

(72) Inventors: Beom Seok Lee, Daejeon (KR); Eung Jin Jang, Daejeon (KR); Sukjae Lee, Daejeon (KR); Kyoung Sik Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 184 days.

(21) Appl. No.: 15/315,705

(22) PCT Filed: Sep. 22, 2015

(86) PCT No.: PCT/KR2015/009964
§ 371 (c)(1),
(2) Date: Dec. 1, 2016

(87) PCT Pub. No.: WO2016/052902
PCT Pub. Date: Apr. 7, 2016

(65) Prior Publication Data
US 2017/0120389 A1   May 4, 2017

(30) Foreign Application Priority Data
Sep. 30, 2014 (KR) ......................... 10-2014-0130819

(51) Int. Cl.
*B23K 26/28* (2014.01)
*B23K 26/0622* (2014.01)
(Continued)

(52) U.S. Cl.
CPC .......... *B23K 26/38* (2013.01); *B23K 26/0622* (2015.10); *B23K 26/0626* (2013.01);
(Continued)

(58) Field of Classification Search
CPC ............ B23K 2101/00; B23K 2101/34; B23K 2101/16; B23K 2101/18; B23K 2103/172;
(Continued)

(56) References Cited

U.S. PATENT DOCUMENTS 5,609,284 A    3/1997  Kondratenko
5,632,083 A *  5/1997  Tada ................... B23K 26/032
                                                         29/827

(Continued)

FOREIGN PATENT DOCUMENTS

CN    1966198 B    6/2010
CN    103052464 A  4/2013
(Continued)

OTHER PUBLICATIONS

Office Action of Japanese Patent Office in Appl'n No. 2016/567998, dated Jul. 2, 2019.

*Primary Examiner* — Michael G Hoang
(74) *Attorney, Agent, or Firm* — Dentons US LLP

(57) ABSTRACT

A method of cutting a polarizing plate by using a laser, and a polarizing plate cut using the same. A beam shape of the laser is configured to have an elliptical shape and a major axis of the elliptical shape parallel to a cutting direction to provide excellent cross-sectional quality and improved productivity.

7 Claims, 8 Drawing Sheets

(51) Int. Cl.
*G02B 5/30* (2006.01)
*B23K 26/073* (2006.01)
*B23K 26/402* (2014.01)
*B23K 26/06* (2014.01)
*B23K 26/38* (2014.01)
*B23K 103/00* (2006.01)
*B23K 103/16* (2006.01)
*B23K 101/00* (2006.01)
*B23K 101/34* (2006.01)

(52) U.S. Cl.
CPC ........ *B23K 26/0736* (2013.01); *B23K 26/402* (2013.01); *G02B 5/3033* (2013.01); *B23K 2101/00* (2018.08); *B23K 2101/34* (2018.08); *B23K 2103/172* (2018.08); *B23K 2103/42* (2018.08); *B23K 2103/54* (2018.08)

(58) Field of Classification Search
CPC ............ B23K 2103/42; B23K 2103/54; B23K 2103/00; B23K 26/00; B23K 31/00; B23K 31/10
USPC ............ 219/121.62, 121.67, 121.72, 121.78, 219/121.79, 121.8
See application file for complete search history.

(56) References Cited

U.S. PATENT DOCUMENTS

| | | | |
|---|---|---|---|
| 6,219,169 B1 * | 4/2001 | Iizuka | G02B 13/10 |
| | | | 359/234 |
| 6,717,101 B2 * | 4/2004 | Morris | B23K 26/0736 |
| | | | 219/121.67 |
| 2002/0027629 A1 | 3/2002 | Choo et al. | |
| 2003/0209528 A1 | 11/2003 | Choo et al. | |
| 2006/0035411 A1 | 2/2006 | Oba et al. | |
| 2006/0098155 A1 | 5/2006 | Choo et al. | |
| 2007/0109526 A1 | 5/2007 | Morikazu et al. | |
| 2010/0116800 A1 | 5/2010 | Nishida et al. | |
| 2012/0000894 A1 | 1/2012 | Abramov et al. | |
| 2013/0146572 A1 | 6/2013 | Watanabe | |
| 2015/0246848 A1 | 9/2015 | Ikenoue et al. | |

FOREIGN PATENT DOCUMENTS

| | | |
|---|---|---|
| CN | 103907051 A | 7/2014 |
| JP | 2000-061677 A | 2/2000 |
| JP | 2000-167681 A | 6/2000 |
| JP | 2005-081715 A | 3/2005 |
| JP | 2005-189530 A | 7/2005 |
| JP | 2006-051517 A | 2/2006 |
| JP | 2006-289388 A | 10/2006 |
| JP | 2012-030243 A | 2/2012 |
| JP | 2012-86230 A | 5/2012 |
| KR | 10-2000-0038529 A | 7/2000 |
| KR | 10-2009-0103991 A | 10/2009 |
| KR | 10-2011-0083881 A | 7/2011 |
| KR | 10-2013-0130692 A | 12/2013 |
| TW | 2012-21262 A1 | 6/2012 |
| TW | 2014-30408 A | 8/2014 |
| TW | 2014-33393 A | 9/2014 |

* cited by examiner

[Figure 1]
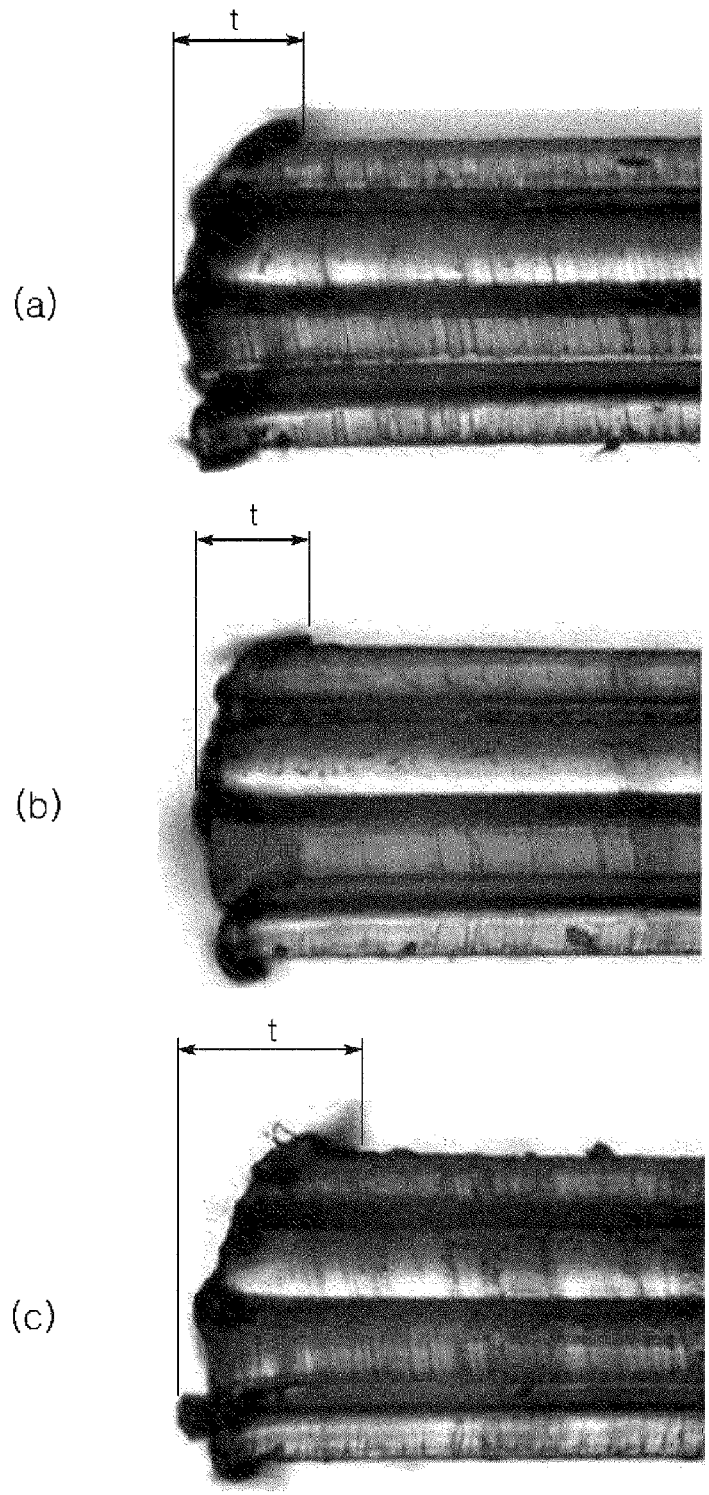

[Figure 2]
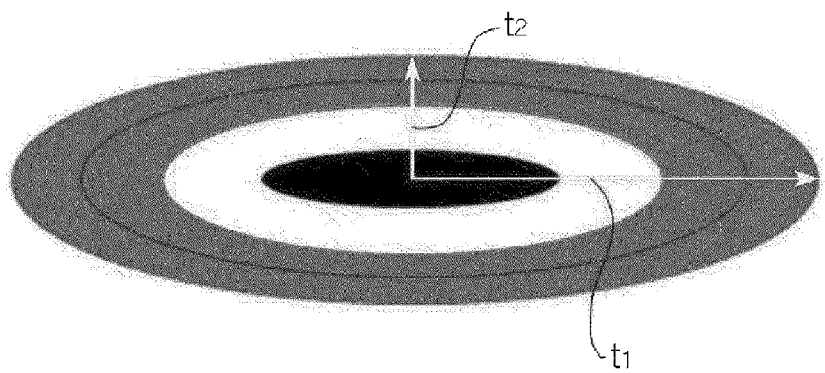
[Figure 3]
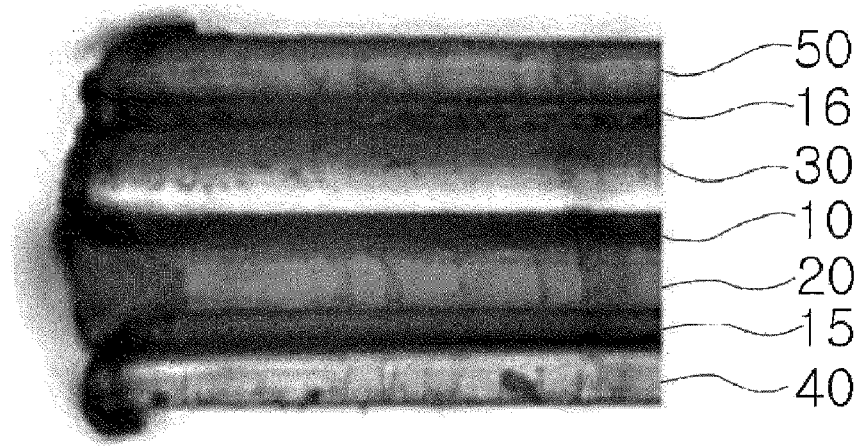
[Figure 4]
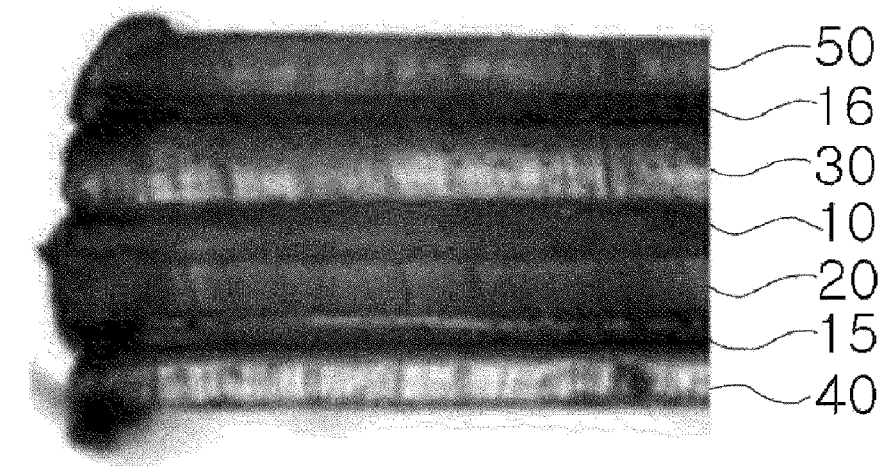

[Figure 5]

[Figure 6]
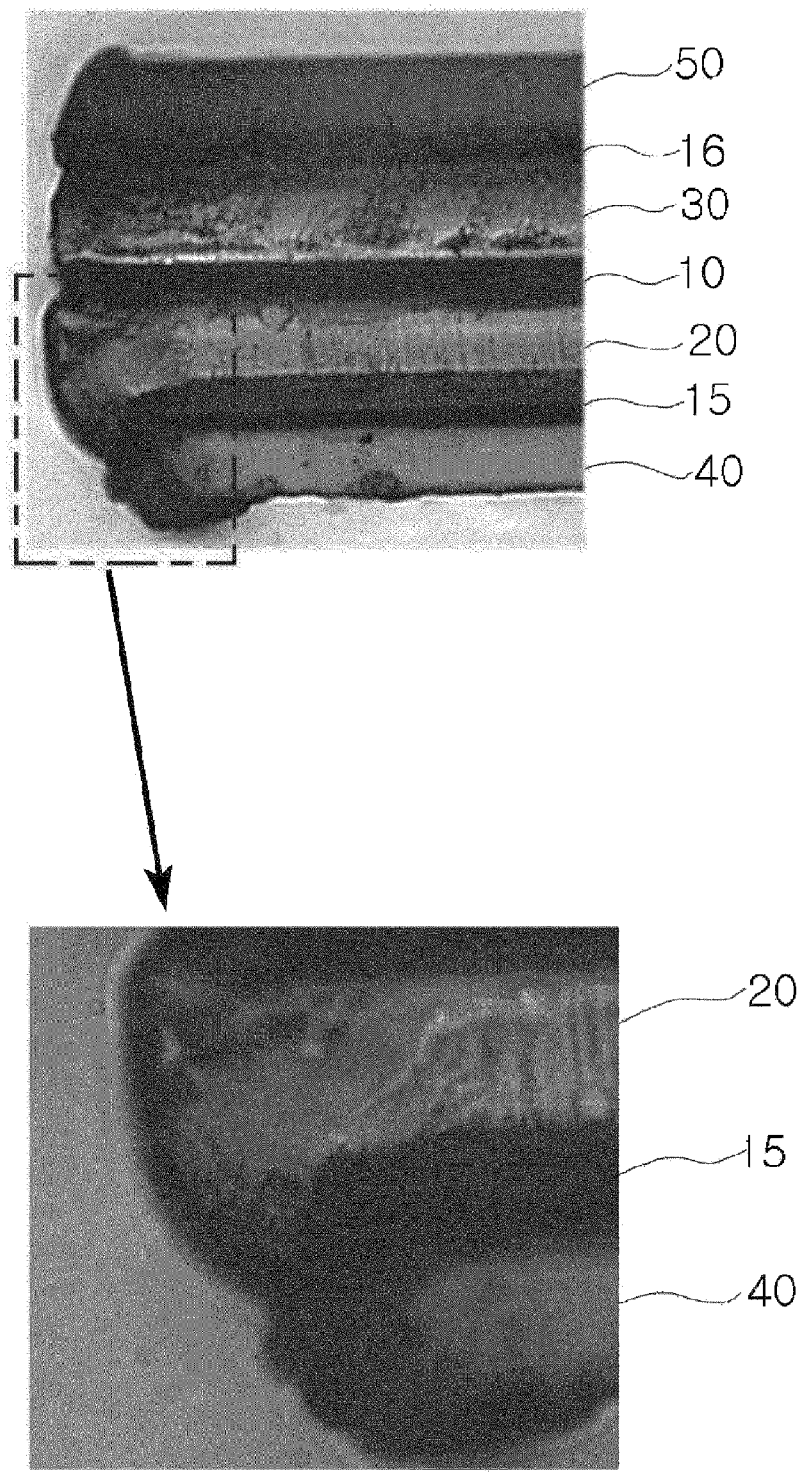

[Figure 7]
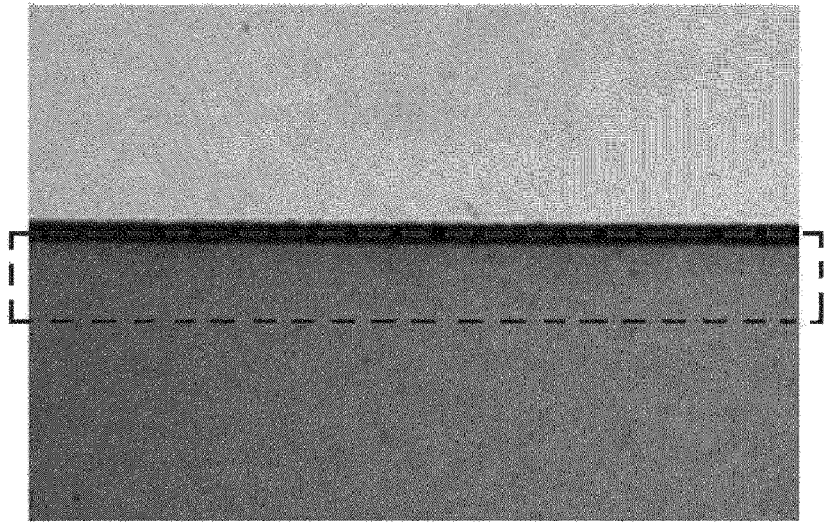
[Figure 8]
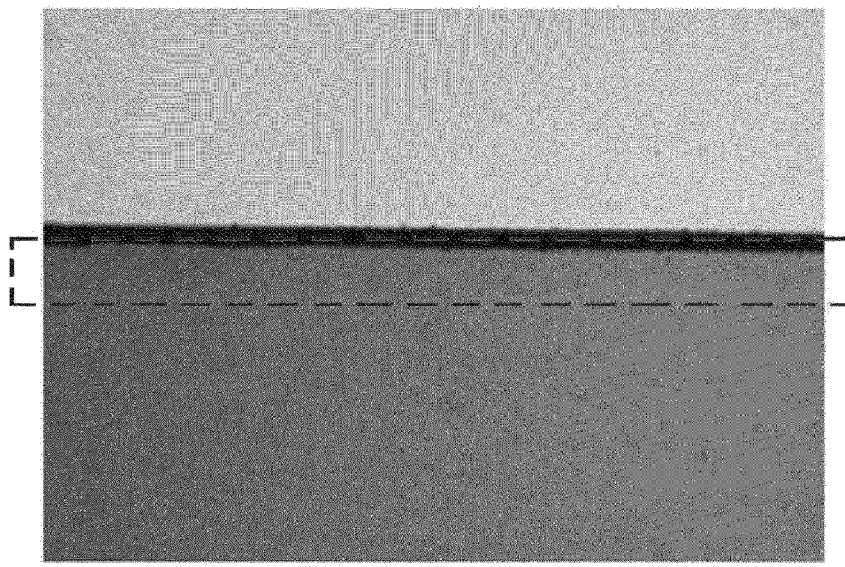

[Figure 9]
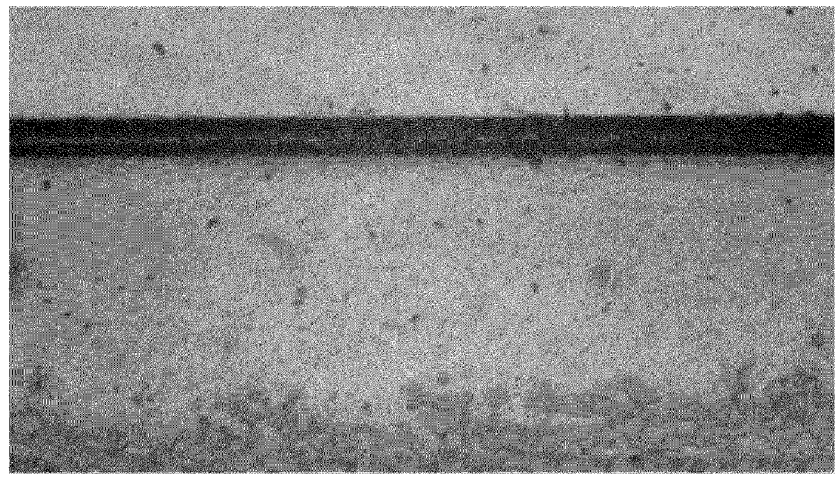
[Figure 10]
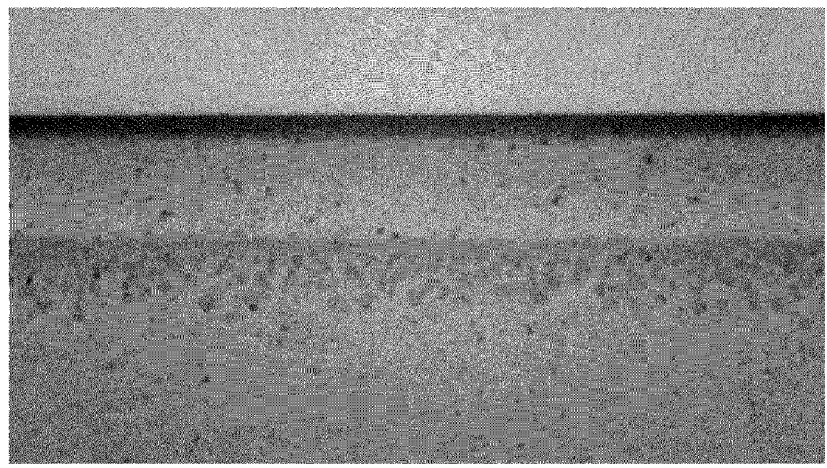

[Figure 11]
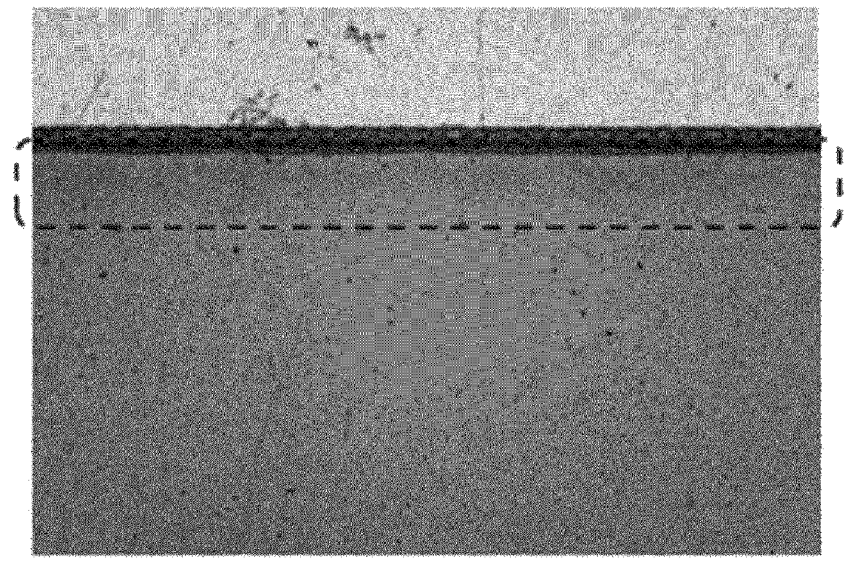

[Figure 12]
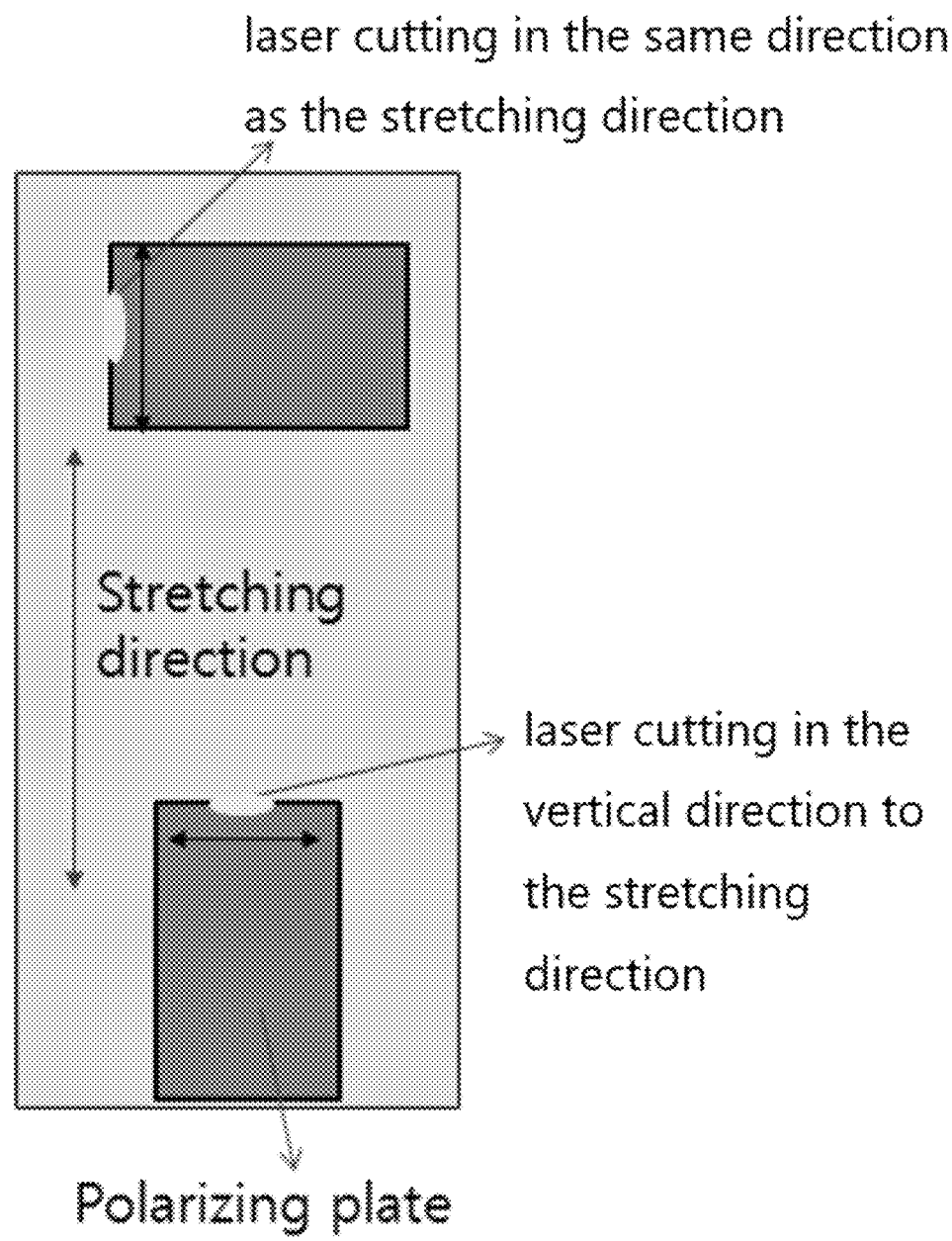

METHOD FOR CUTTING POLARIZING PLATE AND POLARIZING PLATE CUT USING SAME

TECHNICAL FIELD

This application is a National Stage Entry of International Application No. PCT/KR2015/009964, filed Sep. 22, 2015, and claims the benefit of and priority to Korean Application No. 10-2014-0130819, filed on Sep. 30, 2014, all of which are hereby incorporated by reference in their entirety for all purposes as if fully set forth herein.

The present invention relates to a method for cutting a polarizing plate using a laser.

BACKGROUND ART

Since a liquid crystal display device has low power consumption and a small volume and is light and thus easy to carry, compared to a cathode ray display, the liquid crystal display has been rapidly distributed as an optical display element. In general, the liquid crystal display (LCD) device includes a liquid crystal layer and a polarizing plate stacked on both surfaces of a liquid crystal cell composed of a transparent glass substrate or a plastic-based sheet material as a base configuration.

Meanwhile, the polarizing plate usually includes a polarizing element composed of a polyvinyl alcohol (hereinafter, referred to as "PVA")-based resin impregnated with a dichroic dye or iodine and stretched, and has a multilayered structure in which an optical film is stacked via an adhesive and the like on one surface or both surfaces of the polarizing element, a tackifier layer, which is bonded to the liquid crystal cell, and a release film are stacked on one surface of the optical film, and a protective film is stacked on the other surface thereof.

In this case, as the optical film, a cellulose-based optical film represented by triacetyl cellulose (TAC) is generally used in the related art. However, the cellulose-based optical film as described above has disadvantages in that the film does not have sufficient wet heat resistance, and thus polarization performances such as a polarization degree and a color easily deteriorate under high temperature and high humidity environments and the interface between an optical film and a polarizer is easily peeled off. Further, since a phase difference with respect to incident light in an inclination direction is produced, there is a problem in that viewing angle characteristics of a liquid crystal display device, which is gradually enlarged, are affected, and thus, recently, cyclo olefin-based optical films, which are excellent in heat resistance and optical transparency, have been actively used as the optical film.

Meanwhile, a polarizing plate needs to be cut into a predetermined size in order to apply the polarizing plate to a liquid crystal display device. As the cutting method, in the related art, there have been proposed methods of using a knife to cut a polarizing plate and improving the quality of a cut surface through a grinding process, thereby also improving the quality of a finally cut polarizing plate.

However, with the recent trend of enlarging a liquid crystal display device, a need for cutting and grinding processes in order to obtain a polarizing plate cut into a large size has increased, but there is a problem in that the production costs are increased because the technology of cutting a polarizing plate with a large size by using a knife has been insufficiently developed and additional process facilities are required. Further, in the case of the cutting using a knife, in order to secure excellent quality of the cut surface with cracks or wear and tear on the cutting blade of the knife, the cutting blade of the knife needs to be periodically exchanged, thereby leading to a problem in that production costs are increased.

Accordingly, as an alternative thereof, recently, the cutting of a polarizing plate has been actively performed by using a laser. In general, in the case of cutting a polarizing plate using a laser, an excellent cut surface is formed when a laser is selected in consideration of an absorption wavelength of laser light of a film, and then the polarizing plate needs to be cut. However, a polarizing plate including a cyclo olefin-based optical film has an absorption wavelength of a laser light different from that of a cellulose-based optical film usually used in the related art, and thus there occurs a problem in that excessive heat is applied to the polarizing plate in order to cut the polarizing plate, and accordingly, the cut surface of the polarizing plate is deformed. If a cut surface is deformed as described above, adhesion deteriorates when the cut surface is laminated with a liquid crystal cell, and thus a large amount of bubbles are generated on the laminated surface close to the cut surface, and foreign substances such as dust produced due to excessive heat cause appearance defects of a liquid crystal display device, thereby leading to a problem in that loss is generated during the production processes to significantly degrade the productivity.

DETAILED DESCRIPTION OF THE INVENTION

Technical Problem

The present invention is to solve the aforementioned problems and intended to provide a method for cutting a polarizing plate using a laser, and a polarizing plate cut by using the same.

Technical Solution

In an aspect, the present invention provides a method for cutting a polarizing plate using a laser, in which a beam shape of the laser is an elliptical shape and a major axis of the elliptical shape is parallel to a cutting direction.

In another aspect, the present invention provides a polarizing plate cut by the aforementioned method.

Advantageous Effects

A polarizing plate cut according to the present invention is excellent in cross-sectional quality because deformation is not produced on the cut surface and fume may be minimally generated. Further, when the polarizing plate cut according to the present invention is applied to a liquid crystal cell, it is possible to obtain a liquid crystal display device which is excellent in appearance quality and optical characteristics by significantly reducing the bubble generation rate.

Meanwhile, the method for cutting a polarizing plate according to the present invention may be easily applied to the cutting of a large polarizing plate and may simplify the process of cutting the polarizing plate, and thus has an advantage in that the productivity may be improved.

BRIEF DESCRIPTION OF DRAWINGS

FIGS. 1 (a) to (c) are for explaining a taper formation region.

FIG. 2 exemplarily illustrates a beam shape of a laser used for the method for cutting a polarizing plate according to the present invention.

FIG. 3 illustrates a vertical section of a polarizing plate cut according to Example 1.

FIG. 4 illustrates a vertical section of a polarizing plate cut according to Example 2.

FIG. 5 illustrates a vertical section of a polarizing plate cut according to Example 3.

FIG. 6 illustrates a vertical section of a polarizing plate cut according to Comparative Example 1.

FIG. 7 illustrates whether bubbles are generated and fume is generated when the polarizing plate cut according to Example 1 is attached to a glass substrate.

FIG. 8 illustrates whether bubbles are generated and fume is generated when the polarizing plate cut according to Example 2 is attached to a glass substrate.

FIG. 9 illustrates whether bubbles are generated when the polarizing plate cut according to Comparative Example 1 is attached to a glass substrate.

FIG. 10 illustrates whether bubbles are generated when the polarizing plate cut according to Comparative Example 2 is attached to a glass substrate.

FIG. 11 illustrates whether fume is generated on the polarizing plate cut according to Comparative Example 1.

FIG. 12 illustrates the stretching and cutting directions of a polarizing plate according to an exemplary embodiment of this application.

BEST MODE

Hereinafter, preferred exemplary embodiments of the present invention will be described. However, the exemplary embodiments of the present invention may be modified into various other forms, and the scope of the present invention is not limited to the exemplary embodiments which will be described below. Further, the exemplary embodiments of the present invention are provided to more fully explain the present invention to a person with ordinary skill in the art.

As a result of conducting extensive studies to solve the aforementioned problems, the inventors of the present invention have found that it is possible to obtain a polarizing plate which is excellent in quality of a cut surface even though the polarizing plate including two or more films, which are different in absorption wavelengths of a laser, is cut when the cutting process is performed while maintaining a shape of a laser beam as an elliptical shape and allowing a major axis of the elliptical shape to be parallel to a cutting direction, thereby completing the present invention.

More specifically, the present invention is characterized by a method for cutting a polarizing plate using a laser, in which a beam shape of the laser is an elliptical shape and a major axis of the elliptical shape is parallel to a cutting direction. For better understanding, FIG. 2 exemplarily illustrates a beam shape of a laser used for the method for cutting a polarizing plate according to the present invention.

In this case, the elliptical shape may have a ratio of a major axis ($t_1$) to a minor axis ($t_2$) of 1:0.8 to 1:0.2, 1:0.6 to 1:0.2, or 1:0.6 to 1:0.4. When the ratio of the major axis ($t_1$) to the minor axis ($t_2$) of the laser beam shape satisfies the numerical range, the cut surface of the polarizing plate may be prevented from being damaged by heat because it is possible to decrease the average output of the laser applied when the polarizing plate is cut, and thus, the ratio is very advantageous. Further, when the polarizing plate is cut into a circular laser beam shape, excessive fume is generated around the cut surface, and the portion which has not been cut may be produced, and thus, there occurs a problem in that the cutting quality rapidly deteriorates, but the problem may be prevented from occurring by appropriately adjusting the difference between the ratios of the major axis ($t_1$) and the minor axis ($t_2$) of the laser beam shape as described above.

In addition, in order to cut a polarizing plate by using the laser beam with an elliptical shape as described above in the method for cutting a polarizing plate according to the present invention, a combination lens is used without using a single lens as in the related art. In this case, the combination lens may be produced so as to change the diameter of beam incident to an emitting lens through a lens design system according to the use conditions. In this case, the quality of the beam may be made excellent by configuring the diameter of the laser beam shape to be large and parallel as much as possible. The finally produced lens may be configured by a system of producing an ellipse by combining refractive indices and thicknesses such that the lens has appropriate major axis and minor axis. For each lens of the combination lens, the position may be freely adjusted to the emitting direction of the beam, and thus it is possible to adjust the ratio of the major axis to the minor axis in the above-described elliptical shape, if necessary.

In this case, the cutting speed of the laser beam in the process of cutting the polarizing plate may be 100 mm/s to 1,000 mm/s, for example, 100 mm/s to 600 mm/s, 300 mm/s to 600 mm/s, or 600 mm/s to 1,000 mm/s. The polarizing plate may be cut at an appropriate speed in consideration of the process conditions of cutting the polarizing plate, but a more advantageous result may be generally obtained when the polarizing plate is cut at a high speed in order to further improve the quality of the cut surface. However, in consideration of the transfer efficiency of heat generated during the laser cutting of a polarizing plate and the average output of an appropriate laser required for the cutting, when the cutting speed of the laser beam satisfies the numerical range, it is possible to minimize the generation of bubbles and the generation of fume when the polarizing plate subjected to the cutting process is attached to a liquid crystal panel. The fume is a byproduct produced when a polarizing plate is cut, and means a foreign substance such as fine dust, which may be generated in the process of cutting a polarizing plate using a laser, and the like. FIG. 10 illustrates the case where the fume is generated on the polarizing plate cut according to Comparative Example 1, and it can be confirmed that fine dust is formed around a taper formed during the cutting.

Next, the output of the laser beam may vary depending on the thickness of a polarizing plate to be cut, the types of optical film, release film, and protective film, which constitute the polarizing plate, the thickness of a polarizer, the method of performing the cutting process, and the like. However, when the method for cutting a polarizing plate according to the present invention is used, the output of a laser beam required to cut the polarizing plate in the case of using a cyclo olefin-based optical film as an optical film may be 100% to 130% or 110% to 120% based on the case of using a cellulose-based optical film, on the assumption that the thicknesses of the polarizing plates are the same as each other. This is because it is possible to minimize the generation of bubbles when the cut polarizing plate is attached to a liquid crystal panel.

In this case, the pulse energy of the laser beam may be in the range of 1 mJ to 10 mJ, more preferably 5 mJ to 7 mJ. Further, the cutting of a polarizing plate using a laser may be performed by a single cutting system or a multiple cutting system, but is not limited thereto. In particular, it is preferred that the cutting in the present invention is performed by a single cutting system. The single cutting system means that the cutting process is performed by a method of performing the cutting when a laser beam moves once, and in the case of a multiple cutting system in which the cutting process is performed when a laser beam moves several times, different cutting characteristics may be exhibited whenever the laser beam moves, but when the cutting is performed by a single cutting system, the cutting is performed by a one-time process, and thus the quality of the cut surface may be further improved.

Meanwhile, the laser in the method for cutting a polarizing plate according to the present invention may be a $CO_2$ laser or a UV laser. It is preferred that the kind of laser is appropriately selected in consideration of the cutting process conditions and productivity of the polarizing plate. In this case, when the process of cutting a polarizing plate is performed by using a $CO_2$ laser, the oscillation wavelength may be 9.0 μm to 10.9 μm, more specifically, 9.0 μm to 9.6 μm, 10.1 μm to 10.9 μm, or 9.5 μm to 10.5 μm. However, in consideration of the cross-sectional quality of the cut polarizing plate, it may be more preferred that a UV laser is used, and in this case, the wavelength of the UV laser used may be in a range of 300 nm to 400 nm, more preferably 330 nm to 370 nm, and most preferably 350 nm to 360 nm.

Next, the size of a taper formed on a cut surface of a polarizing plate cut by using the cutting method of the present invention may be 50 μm to 150 μm, more preferably 80 μm to 120 μm, and most preferably 90 μm to 100 μm. More specifically, when the stretching direction of the polarizing plate is the same as the cutting direction thereof, as illustrated in FIG. 12, the size of the taper may be 70 μm to 140 μm or 90 μm to 110 μm, and when the polarizing plate is cut in a direction vertical to the stretching direction of the polarizing plate, as illustrated in FIG. 12, the size of the taper may be 70 μm to 140 μm or 90 μm to 110 μm. The size of the taper in the present specification is a value obtained by measuring the maximum width of a portion where there is a deformation on the vertical cross-section of the cut part when the polarizing plate is cut by using a laser as illustrated in FIGS. 1 (a) to (c).

Meanwhile, a polarizing plate which may be cut by using the cutting method according to the present invention will be described.

In the present invention, the polarizing plate may have, for example, a structure in which a protective film/an optical film/a polarizer/an optical film/an adhesive layer/a release film are stacked in this order, but the structure is not limited thereto.

In this case, the polarizer is not particularly limited, and a polarizer well-known in the art, for example, a film composed of polyvinyl alcohol (PVA) including iodine or a dichroic dye may be used. In the present specification, the polarizer means a state in which a protective film (transparent film) is not included, and the polarizing plate means a state in which a protective film (transparent film) is included.

Meanwhile, the polarizing plate according to the present invention may further include an adhesive layer on one surface or both surfaces of the polarizer. In this case, the adhesive which may be used when the adhesive layer is formed may be a water-based or non-water based adhesive generally used in the art.

In this case, as the water-based adhesive, for example, a polyvinyl alcohol-based adhesive, an acrylic adhesive, an epoxy-based adhesive, a urethane-based adhesive, and the like may be used without limitation. In consideration of adhesive strength with the polarizer, and the like, the polyvinyl alcohol-based adhesives among them are preferred, and when a modified polyvinyl alcohol-based adhesive including an acetoacetyl group and the like among them is used, adhesion may be further improved. As specific examples of the polyvinyl alcohol-based adhesives, it is possible to use Gohsefimer (trade name) Z-100, Z-200, Z-200H, Z-210, Z-220, Z-320, and the like manufactured by Nippon Synthetic Chemical Industry Co., Ltd., but the polyvinyl alcohol-based adhesives are not limited thereto.

Here, adhesion of a polarizer with an optical film using the water-based adhesive may be performed by a method of first coating the adhesive on the surface of a PVA film, which is a protective film for a polarizer or a polarizer, by using a roll coater, a gravure coater, a bar coater, a knife coater, or a capillary coater, and the like, and laminating the protective film and the polarizing film by heat-compressing or room temperature-compressing the protective film and the polarizing film using a laminating roll before the adhesive is completely dried. When a hot melt-type adhesive is used, a heat-compression roll needs to be used.

Meanwhile, the non-water based adhesives may be UV-curable adhesives and are not particularly limited, but examples of the non-water based adhesives include: adhesives using a light radical polymerization reaction such as (meth)acrylate-based adhesives, en/thiol-based adhesives, and unsaturated polyester-based adhesives; adhesives using a light cationic polymerization reaction such as epoxy-based adhesives, oxetane-based adhesives, epoxy/oxetane-based adhesives, and vinyl ether-based adhesives, and the like.

In this case, adhesion of the polarizer and the optical film using the non-water based adhesives may be performed by a method of applying an adhesive composition to form an adhesive layer, laminating the polarizer with the optical film, and then curing the adhesive composition through light irradiation.

In the present invention, the optical film generally refers to a film which performs an optical function, and includes not only a transparent film having a light transmittance of 80% or more in a narrow sense, but also an optical film having a light transmittance of 50% or less as long as the optical film is a film, such as a polarizing plate, which performs a specific optical function.

In this case, the optical film may be, for example, one or more selected from the group consisting of a polyolefin film, a polypropylene film, a polyurethane film, an ester-based film, a polyethylene film, a cyclo olefin-based film, an acrylic film, a polyvinyl alcohol-based film, and a cellulose-based film, but is not limited thereto.

More specifically, the polarizing plate may include a polyolefin-based film. When a polarizing plate including a polyolefin-based film is cut by using a laser in the related art, the quality of the cut surface deteriorates, and when the polarizing plate is applied to a liquid crystal cell, there is a problem in that a large amount of bubbles are generated, and thus the appearance quality of a liquid crystal display device deteriorates. However, when the major axis of an ellipse is allowed to coincide with the cutting direction and a polarizing plate is cut by using a laser beam having an elliptical shape as in the present invention, there is an advantage in that the productivity is excellent because it is possible to obtain a polarizing plate having excellent quality of the cut surface, and it is also very easy to apply the laser beam to the process of cutting a large polarizing plate.

Next, the thickness of the optical film may be, for example, 10 μm to 80 μm or 10 μm to 40 μm, but is not limited thereto. This is because when the thickness of the optical film satisfies the numerical range, it is possible to obtain a polarizing plate having excellent optical properties while conforming to the trend for slimness of a liquid crystal display device. Further, according to studies conducted by the present inventors, the thinner the thickness of an optical film is and the smaller the energy of a laser light required for the process of cutting the polarizing plate, that is, the minimum pulse energy required to cut a polarizing film is, the more advantageous the energy efficiency and the cutting quality are (see Examples 1 and 3 to be described below).

If necessary, in the optical film, a surface treatment may be performed on one surface or both surfaces of the optical film or a polyvinyl alcohol-based film in order to further improve adhesive strength. In this case, the surface treatment may be performed through various surface treatments well-known in the art, for example, a corona treatment, a plasma treatment, a surface modification treatment using an aqueous solution of a strong base such as NaOH or KOH, or a primer treatment, and the like.

Meanwhile, as the optical film, optical films composed of the same material may be used on both surfaces of a polarizer, and optical films composed of different materials may also be used on both surfaces of the polarizer. For example, as the optical film, an acrylic film may be used on one surface of a polarizer and a cyclo olefin-based film may be used on the other surface thereof, or a TAC film may be used on one surface of a polarizer and a cyclo olefin-based film may be used on the other surface thereof, and the optical film is not particularly limited.

Meanwhile, the kinds of protective film and release film are not particularly limited as long as those films are typically used in the art. Examples thereof include a polyolefin-based film such as polyethylene, polypropylene, poly-1-butene, poly-4-methyl-1-pentene, an ethylene-propylene copolymer, an ethylene-1-butene copolymer, an ethylene-vinyl acetate copolymer, an ethylene-ethyl acrylate copolymer, and an ethylene-vinyl alcohol copolymer; a polyester-based film such as polyethylene terephthalate, polyethylene naphthalate, and polybutylene terephthalate; a polyamide-based film such as polyacrylate, polystyrene, Nylon6, and partial aromatic polyamide; a polyvinyl chloride film; a polyvinylidene chloride film; or a polycarbonate film, and the like. In particular, in the case of a release film, a release treatment may be appropriately performed by silicone-based, fluorine-based, silica powders, and the like.

In addition, the release film is attached to one surface of an optical film via a tackifier. In this case, the material of tackifier is not particularly limited, and various tackifiers known in the art may be used without limitation. For example, the tackifier may be formed by using a typical polymer such as an acrylic copolymer, natural rubber, a styrene-isoprene-styrene (SIS) block copolymer, a styrene-butadiene-styrene (SBS) block copolymer, a styrene-ethylene butylene-styrene (SEBS) block copolymer, a styrene-butadiene rubber, polybutadiene, polyisoprene, polyisobutylene, butyl rubber, chloroprene rubber, and silicone rubber.

The polarizing plate of the present invention having the configuration as described above may have a thickness of 50 µm to 250 µm. When the polarizing plate is cut by the cutting method according to the present invention, the polarizing plate cut is excellent in quality of the cut surface, and the size of the taper formation region is significantly decreased, and thus it is possible to secure excellent adhesion when the polarizing plate is applied to a liquid crystal cell after a release film and a protective film, which are disposed at the outermost portion, are removed. Since the generation of bubbles is significantly reduced by the excellent adhesion, a liquid crystal display device with excellent appearance characteristics may be obtained.

MODE FOR INVENTION

Example 1

A polarizing plate in which a PET film/a TAC film/a PVA polarizing element/a COP film/a tackifier layer/a PET film were stacked in this order was cut in a direction that is the same as the stretching direction of the polarizing plate by using a laser having a beam shape of an ellipse with a ratio of major axis to minor axis of 1:0.5. In this case, the COP film used had a thickness of 60 µm, and the polarizing plate had a thickness of 250 µm. Furthermore, the laser light required to cut the polarizing plate had a minimum pulse energy of 5.4 mJ, and the cutting speed of 333 mm/s.

Example 2

A polarizing plate was cut in the same manner as in Example 1, except that the polarizing plate was cut in a direction vertical to the stretching direction of the polarizing plate. In this case, the laser light required to cut the polarizing plate had a minimum pulse energy of 6.4 mJ, and the cutting speed of 700 mm/s.

Example 3

A polarizing plate was cut in the same manner as in Example 1, except that a COP film having a thickness of 40 µm was used and the polarizing plate had a thickness of 230 µm. In this case, the laser light required to cut the polarizing plate had a minimum pulse energy of 5 mJ, and the cutting speed of 333 mm/s.

Comparative Example 1

A polarizing plate in which a PET film/a TAC film/a PVA polarizing element/a COP film/a tackifier layer/a PET film were stacked in this order was cut by using a laser having a circular beam shape. In this case, the minimum pulse energy was 6.2 mJ, and the cutting speed was 333 mm/s.

The cross-section of the polarizing plate after the laser cutting is illustrated in FIG. 4. The cut surface was disposed at the left side, and when a polarizing plate including a COP film is cut by using a laser light in the related art, there occurred a phenomenon in which a portion of the COP film was melted and flowed as illustrated in a region represented by a dotted line. Accordingly, a deformation was generated at the cutting end.

Comparative Example 2

A polarizing plate in which a PET film/a TAC film/a PVA polarizing element/a COP film/a tackifier layer/a PET film were stacked in this order was cut in a direction that is vertical to the stretching direction of the polarizing plate by using a laser having a circular beam shape. In this case, the minimum pulse energy was 6.7 mJ, and the cutting speed was 700 mm/s.

Experimental Example 1—Measurement of Size of Taper

The sizes of the portions, in which a taper was formed on the vertical cross-sections of the polarizing plates cut according to Examples 1 to 3 and Comparative Examples 1 and 2, were measured. The measurement was performed by using a microscope (OLYMOUS STM6), and the result is shown in the following Table 1.

TABLE 1

| Classification | Size of Taper |
|---|---|
| Example 1 | 93 μm |
| Example 2 | 101 μm |
| Example 3 | 87 μm |
| Comparative Example 1 | 125 μm |
| Comparative Example 2 | 132 μm |

Experimental Example 2—Presence and Absence of Deformation of Cut Surface

The cross section of the polarizing plates after the laser cutting according to Examples 1 to 3 and Comparative Example 1 were enlarged by using a microscope (OLYMOUS STM6), and then the cut surfaces were allowed to be disposed at the left side and are illustrated in FIGS. 3 to 6.

According to FIGS. 3 to 5, it can be observed in the case of Examples 1 to 3 that the cross-sections of the other layers except for a protective film and a release film, which were disposed at the outermost portion of the polarizing plate, were cleanly cut.

However, as illustrated in FIG. 6, in the case of Comparative Example 1 in which a polarizing plate including a COP film was cut by using a laser light having a circular beam shape, there occurred a phenomenon in which a portion of the COP film was melted and flowed as illustrated in a region represented by a red dotted line. Accordingly, it can be seen that a deformation was generated at the cutting end.

Experimental Example 3—Presence and Absence of Generation of Bubbles and Presence and Absence of Generation of Fume A PET film (release film) at the side where a tackifier layer was formed using the polarizing plate cut according to Examples 1 and 2 and Comparative Examples 1 and 2 was peeled off, attached to a glass substrate, then enlarged by 12.5 times by using a microscope (OLYMOUS STM6), and then, it was observed by the unaided eye whether bubbles were generated. Further, in the polarizing plates according to Examples 1 and 2 and Comparative Example 1, a region in which fume could be generated was represented by a red dotted line.

As illustrated in FIGS. 7 and 8, it can be seen that bubbles were rarely generated on a glass substrate to which a polarizing plate cut according to Examples 1 and 2 was attached, and fume was also rarely generated when the red dotted line region was seen.

In contrast, as illustrated in FIGS. 9 and 10, it can be seen that the glass substrate to which the polarizing plate cut according to Comparative Examples 1 and 2 was attached was laminated in a state where bubbles were generated while forming a thick layer. Further, referring to FIG. 11, it can be confirmed that in the polarizing plate cut according to Comparative Example 1, fine dust was formed while forming a layer around a taper as indicated in the red dotted line region. That is, it could be seen that in the polarizing plate cut according to Comparative Example 1, the cross-sectional quality significantly deteriorated because the foreign substance (fume) and the like were dispersed and attached around the cut surface of the polarizing plate.

Even though the exemplary embodiments of the present invention have been described in detail, the right scope of the present invention is not limited thereto, and it will be obvious to a person with ordinary skill in the art that various modifications and alterations are possible without departing from the technical spirit of the present invention described in the claims.

EXPLANATION OF REFERENCE NUMERALS AND SYMBOLS

10: Polarizer
15: Tackifier layer
16: Adhesive layer
20: COP film
30: TAC film
40: Release film
50: Protective film
$t_1$: Major axis of beam shape
$t_2$: Minor axis of beam shape

The invention claimed is:

1. A method of cutting a polarizing plate by using a laser, the method comprising:
    cutting the polarizing plate by applying a laser beam of the laser on the polarizing plate and moving the laser beam once along a cutting direction,
    wherein the polarizing plate includes a stretched polarizing element composed of a polyvinyl alcohol-based resin impregnated with a dichroic dye or iodine, and a stretching direction of the polarizing plate is defined as the direction in which the polarizing element is stretched,
    wherein a shape of the laser beam is an elliptical shape and a major axis of the elliptical shape parallel to the cutting direction,
    wherein the elliptical shape has a ratio of a major axis to a minor axis of 1:0.6 to 1:0.4,
    wherein the cutting direction is the same as the stretching direction of the polarizing plate or a direction vertical to the stretching direction of the polarizing plate,
    wherein a taper formed on a cut surface of the polarizing plate has a size of 80 μm to 120 μm,
    wherein the polarizing plate comprises a cycloolefin-based film,
    wherein the laser beam has a pulse energy in a range of 1 mJ to 10 mJ, and
    wherein the laser beam has a cutting speed of 100 mm/s to 1,000 mm/s.

2. The method of claim 1, wherein the laser is a $CO_2$ laser or a UV laser.

3. The method of claim 2, wherein the UV laser has a wavelength of 300 nm to 400 nm.

4. The method of claim 2, wherein the $CO_2$ laser has an oscillation wavelength of 9.0 μm to 10.9 μm.

5. The method of claim 1, wherein the cyclo olefin-based film has a thickness of 10 μm to 80 μm.

6. The method of claim 1, wherein the polarizing plate has a thickness of 50 μm to 250 μm.

7. A polarizing plate cut by the method of claim 1.

* * * * *